March 2, 1965 C. J. FRENZEL 3,171,374
SOLDER-FEEDING SOLDERING GUN
Filed Dec. 5, 1962
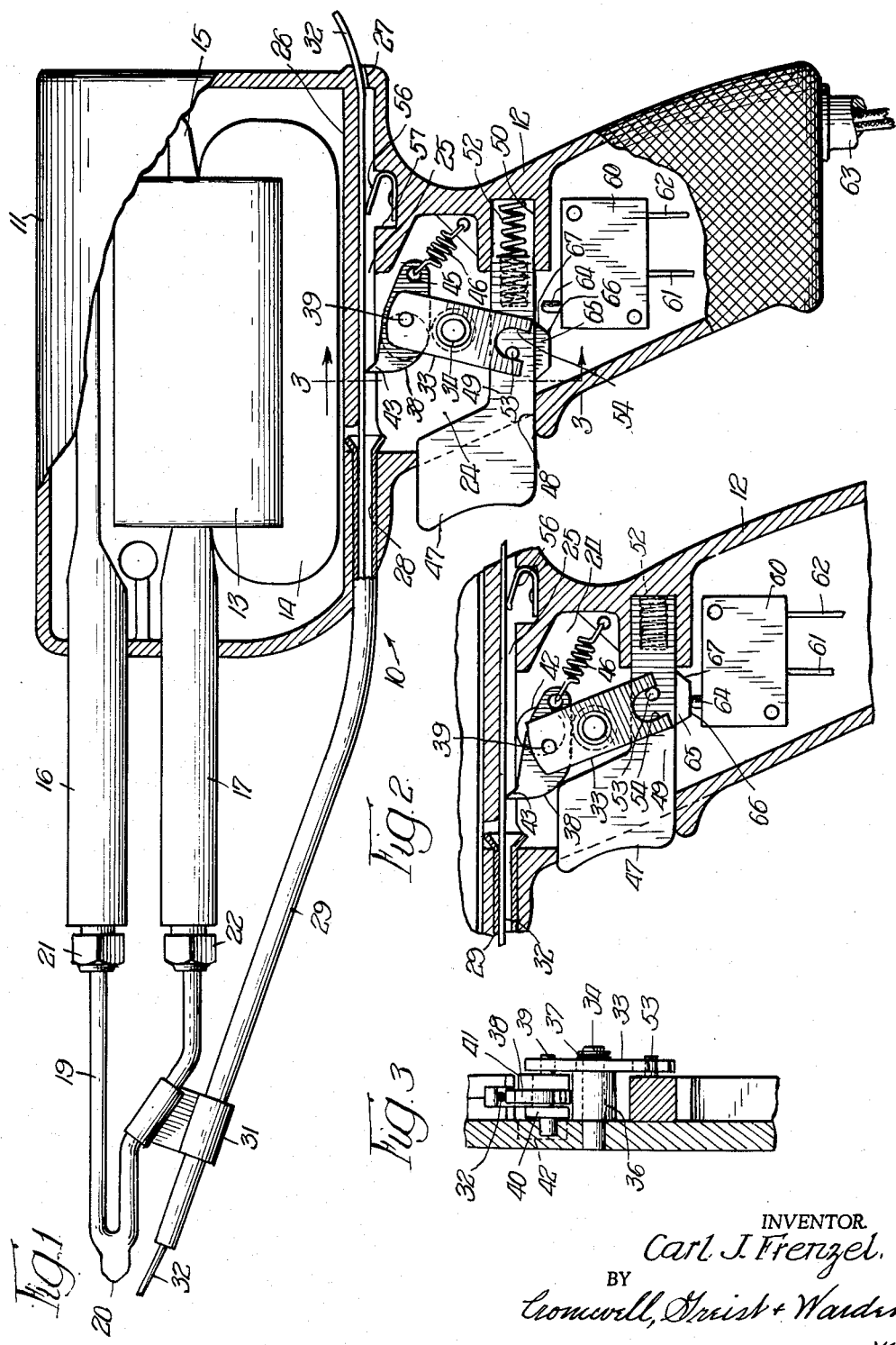
INVENTOR.
Carl J. Frenzel.
BY
Cromwell, Greist & Warden
ATTYS.

United States Patent Office 3,171,374
Patented Mar. 2, 1965

3,171,374
SOLDER-FEEDING SOLDERING GUN
Carl J. Frenzel, Chicago, Ill., assignor to Skil Corporation, Chicago, Ill., a corporation of Delaware
Filed Dec. 5, 1962, Ser. No. 242,562
6 Claims. (Cl. 113—109)

This invention relates to soldering guns, and more particularly to a soldering gun having improved means for feeding a length of solder wire to the soldering tip of the gun and for energizing the heating means of the gun.

It is a primary object of this invention to provide a soldering gun having improved trigger-actuated means for intermittently advancing a length of soldering wire toward the soldering tip of the gun.

It is a further object of this invention to provide a soldering gun having improved trigger-actuated means for energizing the heating means of the gun.

It is an even further object of this invention to provide a soldering gun having improved trigger-actuated means for intermittently advancing a length of solder wire toward the soldering tip of the gun and for simultaneously energizing the heating means of the gun.

It is a still further object of the invention to provide a soldering gun of simple and inexpensive construction which will fulfill the objects set forth above.

These and other objects and advantages of the invention will become apparent from the following specification wherein like numerals refer to similar parts throughout.

In the drawings:

FIG. 1 is a partially broken away side elevation of a soldering gun embodying the invention wherein the trigger of the gun is shown in its extended position;

FIG. 2 is a fragmentary vertical section taken through the handgrip portion of the soldering gun of FIG. 1 wherein the trigger is shown in its depressed position; and FIG. 3 is a section taken along the line 3—3 of FIG. 1.

FIG. 1 illustrates a soldering gun, generally designated 10, which gun includes a casing 11 having a handgrip portion 12 depending therefrom. The casing houses a transformer 13, a primary coil 14, and a secondary coil 15, which secondary coil includes parallel elongated legs 16 and 17. A looped resistance element 19 including a soldering tip 20 has its ends suitably secured, as by nuts 21 and 22, to the legs 16 and 17, respectively. It will be understood that upon energizing of the coils 14 and 15 the soldering tip 20 will be heated almost instantly to a temperature sufficient for fluxing an adjacent end portion of a length of solder wire.

The handgrip portion 12 of the soldering gun casing includes a cavity 24, which cavity communicates with a longitudinally extending elongated opening 25 formed in the casing just below a partition 26. An aperture 27 in communication with the opening 25 is provided in the rear wall of the casing; a bore 28, generally colinear with the elongated opening 25 and in communication with the same, is provided in the casing just forward of the opening 25, which bore is adapted to receive one end of a tubular member 29 for guiding a length of solder wire in the vicinity of the soldering tip 20. A suitable clip 31 engageable with an arm of the resistance heating element 19 and with the tubular member 29 is provided for mounting the forward end of the tubular member at a desired distance from the soldering tip 20.

It should be apparent that the soldering gun 10 is adapted to receive a length of solder wire 32 in the aperture 27 where the solder wire will be allowed to pass through the elongated opening 25 and then into the tubular member 29, which tubular member guides the solder wire in the vicinity of the soldering tip 20. The soldering gun may include means for supporting a spool of solder wire thereon for feeding of the solder wire to the aperture 27. Or, on the other hand as in the case of industrial use of the soldering gun, a spool of solder wire may be mounted on an appropriate support in the vicinity of the gun and fed to the aperture 27 in the soldering gun.

The trigger-actuated means for advancing or feeding a length of solder wire in the tubular member 29 toward the soldering tip 20 includes a generally vertically disposed arm 33 pivotally mounted intermediate the ends thereof on a pin 34, which pin has one end thereof suitably secured in a wall of the handle portion 12 of the soldering gun casing. The pin 34 has a spacing sleeve 36 thereon for holding the arm 33 near the free end of the pin. The arm 33 is secured on the pin 34 by a small split-ring 37, which ring is received in an annular recess in the pin 34.

A generally horizontally disposed pawl 38 is pivotally mounted intermediate the ends thereof to the upper end of the arm 33 by a pin 39. A pair of spacer washers 40 and 41 are provided on opposite sides of the pawl 38 for laterally spacing the pawl below the length of solder wire 32. A circular recess 42 is provided in the inside surface of a wall of the casing handle portion 12, which recess is adapted to receive an end of the pin 39 for limiting the amount of forward and rearward movement of the pawl 38. The pawl includes an upwardly extending tooth 43, which tooth is adapted for biting engagement with the solder wire 32 along the length thereof. The end of the pawl 38 remote from the tooth 43 is provided with a small aperture 45 adapting the pawl for engagement with a small spring 46, which spring has one end thereof secured to the soldering gun casing. It will be apparent that the action of the spring 46 on the end of the pawl remote from the tooth thereof constantly urges the tooth into engagement with the solder wire.

A trigger 47 is adapted to be received in an opening 48 in the handgrip portion 12 of the soldering casing for rectilinear, reciprocating or cycling movement therein. The trigger includes a rearwardly extending trigger extension 49, which extension is adapted to be slidably received in a groove 50 formed in the handgrip portion of the gun casing. The trigger extension 49 is provided at the rear end thereof with a longitudinally extending bore for reception of a spring 52, which spring has one end thereof in contact with a wall of the groove 50 for constantly urging the trigger to its forward or extended position. The trigger extension is disposed in the handgrip portion of the casing generally symmetrical with a vertical center line of the handgrip portion 12, and the trigger extension is provided with a pin 53 extending from one side thereof, which pin is adapted to be received in a U-shaped recess 54 formed in the lower end of the arm 33. Forward movement of the trigger 47 is limited by the pin 53 engaging the forward edge of the recess 54 in the lower end of the arm 33, since the arm 33 is prevented from rotating, in a clockwise direction as seen from FIG. 1, by engagement of one end of the pin 39 with the rear edge of the recess 42. Rearward movement of the trigger is limited by contact of one end of the pin 39 with a forward edge of the recess 42 or by engagement of the rear end of the trigger extension 49 with the rear wall of the groove 50.

A small spring clip 56 is mounted in a recess 57 in the soldering gun casing. The free end of the spring 56 is constantly urged into frictional engagement with the length of solder wire 32 for preventing rearward movement of the same during operation of the solder wire feed means as will be referred to hereinafter.

The operation of the means for feeding the solder wire 32 toward the soldering tip 20 as the trigger 47 is forced rearwardly in the handgrip portion 12 is as follows: After the trigger moves rearwardly a short distance the pin 53 will engage the rear surface of the recess 54 of the arm 33. This small movement of the trigger before the pin 53 thereof engages the rear surface of the recess 54 is an important feature in energizing of the heating means as will be explained hereinafter. Continued rearward movement of the trigger 47 against the spring 52 will result in counterclockwise rotation, as viewed in FIGS. 1 and 2, of the arm 33. This rotation of the arm 33 results in forward movement of the pawl 38. The spring 46 allows the pawl 38 to move forward easily with the upper end of the arm, and as the spring 46 constantly urges the tooth 43 of the pawl into biting engagement with the solder wire 32, the solder wire will be advanced forwardly in the tubular member 29 by forward movement of the pawl as seen in FIG. 2. Release of the trigger 47 results in counterclockwise rotation, as seen in FIGS. 1 and 2, of the arm 33 by the action of the springs 46 and 52. This counterclockwise rotation produces rearward movement of the pawl 38. Rearward movement of the solder wire 32 is prevented by frictional engagement of the edge of the free end of the spring clip 56. Accordingly, during release of the trigger the tooth 43 of the pawl will slide rearwardly from the position shown in FIG. 2 to the position of FIG. 1 where it will be ready to bite again into the solder wire 32 for advancing the same during the next movement or stroke of the pawl 38. It is believed to be apparent from the above description that continued cycling or reciprocating movement of the trigger 47 will result in intermittent advancing of the solder wire 32 through the casing and into the tubular member 29.

A switch 60 having a pair of terminals 61 and 62 is housed in the handgrip portion 12 of the gun casing. Appropriate electrical leads (not shown) place the switch 60 in electrical contact with an inlet cord 63 and the heating means of the soldering iron for energizing the heating means upon closing of the switch 60. The switch 60 is mounted in the handgrip portion just below the trigger extension 49, and the switch 60 is provided with an upwardly extending depressible plunger 64. Depressing of the plunger 64 results in closing of the switch 60 thereby energizing the heating means of the soldering gun. A projection 65 depends from the underside of the trigger extension 49, which projection is adapted to engage and depress the plunger 64 upon rearward movement of the trigger 47. The projection 65 includes a generally horizontal lower flat face 66 and an inclined rearward face 67, which face 67 adapts the projection for smooth depression of the plunger 64 upon rearward movement of the trigger. It will be realized that upon rearward movement of the trigger the inclined face 67 will engage and depress the plunger 64, which plunger will remain depressed as long as the upper end thereof is in sliding contact with the projection face 66. In other words, the trigger 47 may be reciprocated or cycled through a distance equal to the length of the face 66 while maintaining the plunger 64 in its depressed position.

Preferably, the projection 65 is so located on the trigger extension 49 that upon actuation of the trigger inclined face 67 will depress plunger 64 and actuate the switch 60 before the pin 53 traverses recess 54 and strikes the rear edge of the recess to operate the solder feeding mechanism. The purpose of this construction is to permit an operator to bring the soldering gun up to soldering temperature before solder is fed toward the soldering tip 20. This feature helps to eliminate the possibility of unsatisfactory cold soldered joints, and permits the use of the soldering gun of this invention to remove solder from previously formed soldered connections without feeding or wasting new solder.

The operation of the trigger-actuated means for intermittently advancing the length of solder wire and for simultaneously energizing the heating means of the soldering gun will now be described:

Depressing of the trigger 47 results in rearward movement of the projection 65 thereby bringing the inclined face 67 into engagement with the plunger 64 for actuation of the switch 60 and energizing of the heating means. Continued rearward movement of the trigger results in engagement of the pin 53 with the rear edge of the recess 54 in the arm 33. As explained above, this results in counterclockwise rotation of the arm 33 and forward movement of the pawl 38 thereby advancing the solder wire 32 forwardly through the tubular member 29 to the vicinity of the soldering tip 20. Because of the shape of the projection 65, i.e., because of the flat face 66, the plunger 64 will remain depressed after it has been engaged by the projection 65 for the remaining portion of the rearward stroke of the trigger. Likewise, the plunger 64 will remain depressed during forward movement of the trigger as long as the projection face 66 remains in contact with the tip of the plunger. Accordingly, the trigger 47 may be reciprocated through a distance equal to the length of the face 66 while maintaining the plunger 64 in its depressed position. This length of reciprocating movement or stroke of the trigger is sufficient for intermittently advancing the solder wire 32 at a proper rate for being fluxed by the soldering tip 20. Manifestly, the trigger-actuated means described permits a length of solder wire 32 to be intermittently advanced toward the tip of the soldering gun while the heating means of the soldering gun is maintained in its energized condition for melting of the solder as it is advanced toward the soldering tip. Complete release of the trigger results in forward movement of the projection 65 to a position where it will no longer be in engagement with the plunger 64, thereby allowing the plunger to extend to its uppermost position for opening of the switch 60 which de-energizes the heating means of the soldering gun.

Thus it will be seen that the trigger-actuated means of this invention provides for intermittently advancing a length of solder wire toward the soldering tip of the gun while at the same time maintaining the heating means of the soldering gun in its energized condition for melting of the solder as it is advanced. Also, the trigger-actuated means permits the soldering tip of the gun to be heated before solder is advanced toward the tip. The mechanism described includes few moving parts adapting the same for inexpensive manufacture and rendering the same unlikely to become inoperative.

While the invention has been shown in but one form it will be obvious to those skilled in the art that it is not to be so limited, but on the contrary it is susceptible of various changes and modifications without departing from the spirit and scope of the appended claims.

I claim:

1. An electric soldering gun comprising, a casing having elongated heating means extending therefrom, which heating means terminates in a tip member, tubular means for guiding a length of solder wire toward said tip, a handgrip portion depending from the casing, a pawl supported in said casing, said pawl having the tooth thereof adapted for biting engagement with a length of solder wire for advancing the same into said tubular means, a trigger supported in said handgrip portion for movement between an outer and an inner position, which trigger is connected to said pawl by linkage means for intermittently advancing the solder wire upon cycling of the trigger between said positions, a switch in said casing for energizing said heating means, which switch has a depressible plunger for actuation of the switch, means associated with said trigger for engaging and maintaining said plunger in its depressed position during cycling movement of the trigger between said positions, whereby said heating means is maintained in an energized condition as said solder wire is intermittently advanced toward said tip.

2. In an electric soldering gun, in combination, a casing having elongated heating means extending therefrom, which heating means terminates in a tip member, tubular means for guiding a length of solder wire toward said tip, a handgrip portion depending from the casing, a pawl supported in said casing, said pawl having the tooth thereof adapted for biting engagement with a length of solder wire for advancing the same into said tubular means, a trigger supported in said handgrip portion for movement between an outer and an inner position, which trigger is connected to said pawl by linkage means for intermittently advancing the solder wire upon cycling of the trigger between said positions, a switch mounted in said casing beneath said trigger for energizing said heating means, which switch has a depressible plunger extending upwardly therefrom for actuation of the switch, said trigger being configured for engaging and maintaining the plunger in its depressed position during cycling movement of the trigger between said positions, whereby said heating means is maintained in an energized condition as said solder wire is intermittently advanced toward said tip.

3. An electric soldering gun comprising, a casing having heating means therein, which casing has a handgrip portion depending therefrom, a trigger mounted in said handgrip portion for cyclical movement between an outer position and an inner position, solder wire feed means in said casing associated with said trigger for intermittently advancing a length of solder wire through said casing upon cycling of said trigger, a switch in said casing for energizing said heating means, means associated with said trigger for closing said switch and maintaining the same in its closed position during cycling movement of the trigger between said positions.

4. An electric soldering gun comprising, a casing having heating means therein, which casing has a handgrip portion depending therefrom, a trigger mounted in said handgrip portion for cyclical movement between an outer position and an inner position, solder wire feed means in said casing associated with said trigger for intermittently advancing a length of solder wire through said casing upon cycling of said trigger, a switch mounted in said casing beneath said trigger, which switch has a depressible plunger extending upwardly therefrom, said trigger being configured for depressing said plunger and maintaining the same depressed during cycling movement of the trigger between said positions.

5. An electric soldering gun comprising, a casing having elongated heating means extending therefrom, which heating means terminates in a tip member, tubular means for guiding a length of solder wire toward said tip, a handgrip portion depending from the casing, a generally vertically disposed arm pivotally mounted intermediate the ends thereof to a wall of said handgrip portion, a pawl pivotally secured to the upper end of said arm, said pawl having the tooth thereof adapted for biting engagement with a length of solder wire for advancing the same into said tubular means, means for constantly urging said tooth into engagement with the solder wire, a trigger supported in said handgrip portion for movement between an inner and an outer position, which trigger is engageable with the lower end of said arm by a lost motion connection for advancing the solder wire upon cycling movement of the trigger between said inner position and a third position intermediate said positions, a switch in said casing for energizing said heating means, whch switch has a depressible plunger for actuation of the switch, means associated with the trigger for maintaining said plunger in its depressed position during cycling movement of the trigger between said inner and third positions, whereby said heating means is maintained in an energized condition as said solder wire is intermittently advanced toward said tip.

6. In an electric soldering gun, in combination, a casing having elongated heating means extending therefrom, which heating means terminates in a tip member, tubular means for guiding a length of solder wire toward said tip, a handgrip portion depending from the casing, a generally vertically disposed arm pivotally mounted intermediate the ends thereof to a wall of said handgrip portion, a pawl pivotally secured to the upper end of said arm, said pawl having the tooth thereof adapted for biting engagement with a length of solder wire for advancing the same into said tubular means, a trigger supported in said handgrip portion for movement between an inner and outer position, which trigger is engageable with the lower end of said arm by a lost motion connection for intermittently advancing the solder wire upon cycling movement of the trigger between said inner position and a third position intermediate said positions, a switch mounted in said casing beneath said trigger for energizing said heating means, which switch has a depressible plunger extending upwardly therefrom for actuation of the switch, said trigger being configured for engaging and maintaining said plunger in its depressed position during cycling movement of the trigger between said inner and third positions, whereby said heating means is maintained in an energized condition as said solder wire is intermittently advanced toward said tip.

References Cited in the file of this patent

UNITED STATES PATENTS

| | | |
|---|---|---|
| 2,396,799 | McCully | Mar. 19, 1946 |
| 2,416,370 | Barstad | Feb. 25, 1947 |
| 2,765,390 | Chapel et al. | Oct. 2, 1956 |
| 2,789,198 | Dye et al. | Apr. 16, 1957 |
| 2,901,585 | Baccari et al. | Aug. 25, 1959 |
| 3,097,286 | Luke | July 9, 1963 |

FOREIGN PATENTS

| | | |
|---|---|---|
| 675,973 | Great Britain | July 16, 1952 |